US012083432B2

(12) United States Patent
Zhao et al.

(10) Patent No.: US 12,083,432 B2
(45) Date of Patent: Sep. 10, 2024

(54) INTERACTION METHOD AND APPARATUS, AND COMPUTER STORAGE MEDIUM FOR GAME OPERATION INTERFACE

(71) Applicant: Beijing Zitiao Network Technology Co., Ltd., Beijing (CN)

(72) Inventors: Yang Zhao, Beijing (CN); Guanhua Yan, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/511,378

(22) Filed: Nov. 16, 2023

(65) Prior Publication Data

US 2024/0082728 A1    Mar. 14, 2024

Related U.S. Application Data

(63) Continuation of application No. PCT/CN2022/109586, filed on Aug. 2, 2022.

(30) Foreign Application Priority Data

Sep. 14, 2021   (CN) .......................... 202111074926.1

(51) Int. Cl.
*A63F 13/56* (2014.01)
*A63F 13/533* (2014.01)
*A63F 13/58* (2014.01)

(52) U.S. Cl.
CPC ............ *A63F 13/56* (2014.09); *A63F 13/533* (2014.09); *A63F 13/58* (2014.09)

(58) Field of Classification Search
CPC ........ A63F 13/822; A63F 13/45; A63F 13/52; A63F 13/56; A63F 13/533; A63F 13/537;
(Continued)

(56) References Cited

U.S. PATENT DOCUMENTS 10,974,143 B2 * 4/2021 Taguchi .................. A63F 13/35
11,344,811 B2 * 5/2022 Asano ..................... A63F 13/35
(Continued)

FOREIGN PATENT DOCUMENTS

CN          1573791 A      2/2005
CN        102103640 A      6/2011
(Continued)

OTHER PUBLICATIONS wiki.roll20.net, "Turn tracker", Nov. 23, 2018, <https://wiki.roll20.net/index.php?title=Turn_Tracker&oldid=17083> (Year: 2018).*

*Primary Examiner* — Justin L Myhr

(57) ABSTRACT

An interaction method and apparatus, and a computer storage medium are provided. The method includes: displaying, in a game operation interface, a plurality of virtual characters that participate in a game task; acquiring identifiers of the virtual characters, sorting the identifiers based on the execution order of a first action by the plurality of virtual characters in the game task to generate an identifier sequence, and displaying the identifier sequence in an identifier sequence display area; in the game operation interface, generating and displaying an action value area; in response to a virtual character executing the first action, controlling the identifier sequence to move; and when the virtual character executing the first action is a first virtual character and the executed first action meets a preset condition, displaying an action value acquired by means of the first virtual character executing the first action.

15 Claims, 10 Drawing Sheets

(58) Field of Classification Search
CPC .... A63F 13/55; A63F 13/58; A63F 2300/308; A63F 2300/55; A63F 2300/807
See application file for complete search history.

(56) References Cited

U.S. PATENT DOCUMENTS

| | | | | |
|---|---|---|---|---|
| 2002/0142833 | A1* | 10/2002 | Tsuchida | A63F 13/822 |
| | | | | 463/31 |
| 2003/0236111 | A1 | 12/2003 | Otani et al. | |
| 2004/0259634 | A1* | 12/2004 | Machida | A63F 13/67 |
| | | | | 463/29 |
| 2006/0205460 | A1* | 9/2006 | Shimosato | A63F 13/822 |
| | | | | 463/1 |
| 2007/0060226 | A1* | 3/2007 | Sakaguchi | A63F 13/45 |
| | | | | 463/1 |
| 2012/0021840 | A1* | 1/2012 | Johnson | A63F 13/60 |
| | | | | 463/43 |
| 2014/0235334 | A1* | 8/2014 | Tarumi | A63F 13/837 |
| | | | | 463/31 |
| 2016/0042566 | A1* | 2/2016 | Mao | A63F 13/213 |
| | | | | 463/31 |

FOREIGN PATENT DOCUMENTS

| | | |
|---|---|---|
| CN | 104536668 A | 4/2015 |
| CN | 104978488 A | 10/2015 |
| CN | 107812385 A | 3/2018 |
| CN | 108037952 A | 5/2018 |
| CN | 109499068 A | 3/2019 |
| CN | 109568963 A | 4/2019 |
| CN | 111135580 A | 5/2020 |
| CN | 112569604 A | 3/2021 |
| CN | 112870697 A | 6/2021 |
| CN | 113713390 A | 11/2021 |
| JP | 2014233366 A | 12/2014 |

* cited by examiner

INTERACTION METHOD AND APPARATUS, AND COMPUTER STORAGE MEDIUM FOR GAME OPERATION INTERFACE

CROSS-REFERENCE TO RELATED APPLICATIONS

The present application is a continuation of International Patent Application No. PCT/CN2022/109586, filed on Aug. 2, 2022, which claims priority of Chinese Patent Application No. 202111074926.1, filed on Sep. 14, 2021, and the entire content disclosed by the Chinese patent application is incorporated herein by reference as part of the present application.

TECHNICAL FIELD

The present disclosure relates to the field of Internet technology, and more particularly, to an interaction method and apparatus, and a computer storage medium.

BACKGROUND

With the development of the Internet technology, various types of games have been gradually developed to meet the entertainment needs of users, such as turn-based games, single-player games, multiplayer online games, and so on.

The combat mechanism in an existing turn-based game is generally that a character of one's own side obtain an action point after performing an action, and multiple action points are accumulated and then used to automatically converted into energy, which can then be used to release the necessary fatal assault skills; the above combat mechanism cannot be visualized in the game process, which makes it difficult for the user to understand the interaction mechanism during the game process, resulting in a poor interaction experience.

SUMMARY

The embodiments of the disclosure at least provide an interaction method, an interaction apparatus, a computer device, and a computer-readable storage medium.

In a first aspect, an embodiment of the present disclosure provides an interaction method, comprising:
  displaying a plurality of virtual characters, which participate in a game task, in a game operation interface, a plurality of the virtual characters comprising at least one first virtual character and at least one second virtual character of a different camp from the first virtual character;
  sorting identifiers of the plurality of virtual characters based on an order of execution of a first action by the plurality of the virtual characters in the game task to generate an identifier sequence, and displaying the identifier sequence in an identifier sequence display area;
  displaying an action value area in the game operation interface, wherein the action value area comprises a plurality of action value units, each of the action value units is used to store an action value, and wherein the first virtual character each obtains an action value by executing the first action, and the action value is a resource for executing a second action;
  controlling a movement of the identifier sequence in response to the execution of the first action by the virtual characters; and
  displaying the action value obtained by the first virtual character executing the first action in the action value units of the action value area, when the virtual character executing the first action is the first virtual character and the first action executed meets a preset condition.

In one possible embodiment, an identifier positioned at a beginning and/or an end of the identifier sequence is adjacent to the action value area;
  the controlling the movement of the identifier sequence in response to the execution of the first action by the virtual character, comprises:
  in response to any one of first virtual characters executing the first action, placing an identifier of the any one of the first virtual characters in the beginning and/or the end position in the identifier sequence adjacent to the action value area, and controlling the identifier sequence to move toward the action value area.

In one possible embodiment, the method further comprising:
  displaying an energy value area on one side of the action value area, wherein the energy value area comprises a plurality of energy value units, each energy value unit is used to store an energy value, and the identifier sequence, the action value area and the energy value area are arranged in an L-shape;
  the method further comprises:
  after each of the action value units of the action value area has stored a corresponding action value, converting action values in the action value area into energy values, and storing the energy values that has been converted in the energy value units of the energy value area.

In one possible embodiment, the converting the action values in the action value area into the energy values, comprises:
  converting the action values in the action value area into the energy values according to a conversion ratio between the action values in the action value area and the energy values.

In one possible embodiment, the conversion ratio is determined by following way:
  determining the conversion ratio according to a first virtual character corresponding to each of the action values in the action value area and an action gain coefficient of the first virtual character; and/or
  determining the conversion ratio according to a current stage of game.

In one possible embodiment, the method further comprising:
  displaying an amount of an energy value required for each of first virtual characters to execute the second action in the game operation interface, wherein the amount of the energy value required for each of the first virtual characters to execute the second action is associated with an action attribute of the second action.

In one possible embodiment, the method further comprising:
  in response to each of the first virtual characters executing the second action, displaying an energy consumption special effect of energy values of a corresponding amount in the energy value area, according to the amount of the energy value required by the second action.

In one possible embodiment, upon displaying the energy consumption special effect, the method further comprises:
  displaying a completion special effect showing each of the first virtual characters completing the second action.

In one possible embodiment, upon displaying the energy consumption special effect, the method further comprises:
displaying an injury special effect showing the second virtual character being injured by the second action.

In one possible embodiment, the action value units in the action value area are arranged in a circular pattern.

In a second aspect, an embodiment of the present disclosure provides an interaction apparatus, comprising:
a first display module configured to display a plurality of virtual characters, which participate in a game task, in a game operation interface, a plurality of the virtual characters comprising at least one first virtual character and at least one second virtual character of a different camp from the first virtual character;
a second display module configured to sort identifiers of the plurality of virtual characters based on an order of execution of a first action by the plurality of the virtual characters in the game task to generate an identifier sequence, and displaying the identifier sequence in an identifier sequence display area;
a third display module configured to display an action value area in the game operation interface, wherein the action value area comprises a plurality of action value units, each of the action value units is used to store an action value, and wherein the first virtual character each obtains an action value by executing the first action, and the action value is a resource for executing a second action;
a control module configured to control a movement of the identifier sequence in response to the execution of the first action by the virtual characters; and
a processing module configured to display the action value obtained by the first virtual character executing the first action in the action value units of the action value area, when the virtual character executing the first action is the first virtual character and the first action executed meets a preset condition.

In one possible embodiment, an identifier positioned at the beginning and/or the end of the identifier sequence is adjacent to the action value area; the control module, when executing the controlling the movement of the identifier sequence in response to the execution of the first action by the virtual character, is specifically configured to:
in response to any one of first virtual characters executing the first action, place an identifier of the any one of the first virtual characters at the beginning and/or the end position in the identifier sequence adjacent to the action value area, and control the identifier sequence to move toward the action value area.

In one possible embodiment, the third display module is further configured to: display an energy value area on one side of the action value area, wherein the energy value area comprises a plurality of energy value units, each energy value unit is used to store an energy value, and the identifier sequence, the action value area and the energy value area are arranged in an L-shape;
the processing module is further configured to: after each of the action value units of the action value area has stored a corresponding action value, convert action values in the action value area into energy values, and storing the energy values that have been converted in the energy value units of the energy value area.

In one possible embodiment, the processing module, when executing the conversion of the action values in the action value area into the energy values, is specifically configured to: convert the action values in the action value area into the energy values according to a conversion ratio between the action values in the action value area and the energy values.

In one possible embodiment, the conversion ratio is determined by following way:
the processing module is configured to determine the conversion ratio according to convert the action values in the action value area into the energy values according to a conversion ratio between the action values in the action value area and the energy values first virtual character corresponding to each of the action values in the action value area and an action gain coefficient of the first virtual character; and/or determining the conversion ratio according to a current stage of game.

In one possible embodiment, the third display module is further configured to: display an amount of an energy value required for each of first virtual characters to execute the second action in the game operation interface, wherein the amount of the energy value required for each of the first virtual characters to execute the second action is associated with an action attribute of the second action.

In one possible embodiment, the third display module is further configured to: in response to each of the first virtual characters executing the second action, display an energy consumption special effect of energy values of a corresponding amount in the energy value area, according to the amount of the energy value required by the second action.

In one possible embodiment, upon the third display module displaying the energy consumption special effect, the third display module is further configured to: display a completion special effect showing each of the first virtual characters completing the second action.

In one possible embodiment, upon the third display module displaying the energy consumption special effect, the third display module is further configured to: display an injury special effect showing the second virtual character being injured by the second action.

In one possible embodiment, the action value units in the action value area are arranged in a circular pattern.

In a third aspect, an embodiment of the present disclosure provides a computer device, comprising a processor and a memory, wherein the memory is configured to store machine-readable instructions executable by the processor, the processor is configured to execute the machine-readable instructions stored in the memory, and upon the machine-readable instructions being executed by the processor, the processor executes the steps in the first aspect described above, or in any possible embodiments of the first aspect.

In a fourth aspect, an embodiment of the present disclosure provides a computer-readable storage medium, wherein a computer program is stored in the computer-readable storage medium, and the computer program is run to execute the steps in the first aspect described above, or in any of the possible embodiments of the first aspect.

The interaction method proposed by the embodiment of the present disclosure, the identifier sequence consisting of the identifier of the plurality of virtual characters can be displayed in the game operation interface, and the action value area can also be displayed; when the virtual character executing the first action, the current action of the virtual character can be visually reflected by moving the identifier sequence, and when it is determined that the virtual character executing the first action is the first virtual character and the executed first action meets the preset condition, the action value obtained by the first virtual character after executing the first action can be stored in an action value unit in the action value area, and the action value obtained by the first virtual character executing the first action can be displayed in the action value unit in the action value area, so that the accumulation process of the action value can be visually displayed, which is convenient for the user to understand the rules of game and the interaction process and improve the interaction experience.

In addition, in an embodiment of this disclosure, after the action value units in the action value area have been stored the corresponding action values, the action values will be converted into the energy values, and the storage process of storing the energy value in the energy value unit in the energy value area will be visually displayed to the user, so that the user can easily understand the conversion process between the action values and the energy values in the rules of game.

For the description of the effects of the above-mentioned interaction apparatus, computer device, and computer-readable storage medium, please refer to the description of the above-mentioned interactive method, which is not repeated here.

In order to make the above objects, features and advantages of the present disclosure more obvious and understandable, the following are detailed description of preferred embodiments, with the attached drawings.

BRIEF DESCRIPTION OF DRAWINGS

In order to more clearly illustrate the technical solutions of the embodiments of the present disclosure, the following is a brief introduction to accompanying drawings to be used in the embodiments, which are herein incorporated in the specification and form a part hereof, and which show embodiments conforming to the present disclosure and are used together with the specification to illustrate the technical solutions of the present disclosure. It should be understood that the following drawings show only certain embodiments of the present disclosure, and therefore should not be regarded as limiting the scope, and that other relevant drawings may be obtained from these drawings by a person of ordinary skill in the art without creative labor.

DETAILED DESCRIPTION

In order to make the purpose, technical scheme and advantages of embodiments of the present disclosure more clearly, the technical scheme in the embodiment of the disclosure will be described clearly and completely with the attached drawings. Obviously, the described embodiment is only a part of the embodiment of the disclosure, but not the whole embodiment. Components of embodiments of the present disclosure generally described and illustrated herein may be arranged and designed in various different configurations. Therefore, the following detailed description of the embodiments of the present disclosure is not intended to limit the scope of the claimed disclosure, but merely represents selected embodiments of the disclosure. Based on the embodiments of the present disclosure, all other embodiments obtained by those skilled in the art without creative work belong to the scope of protection of the present disclosure.

It should be noted that a game round battle scenario is only a possible implementation scenario of the embodiments of the disclosure, and the embodiments of the disclosure are not limited by application scenarios, and all game interaction scenarios involving role actions should be within the protection scope of the disclosure.

It should be noted that similar reference numbers and letters indicate similar items in following drawings, so once an item is defined in a drawing, it does not need to be further defined and explained in subsequent drawings.

In order to facilitate the understanding of this embodiment, firstly, an interaction method disclosed in the embodiment of the disclosure is introduced in detail, and the executing body of the interaction method provided in the embodiment of the disclosure is generally a computer device with certain computing capability. In some possible implementations, the interaction method can be realized by a processor upon executing computer-readable instructions stored in a memory.

Next, the interaction methods of the embodiments of the present disclosure will be described in detail.

Figure 1:
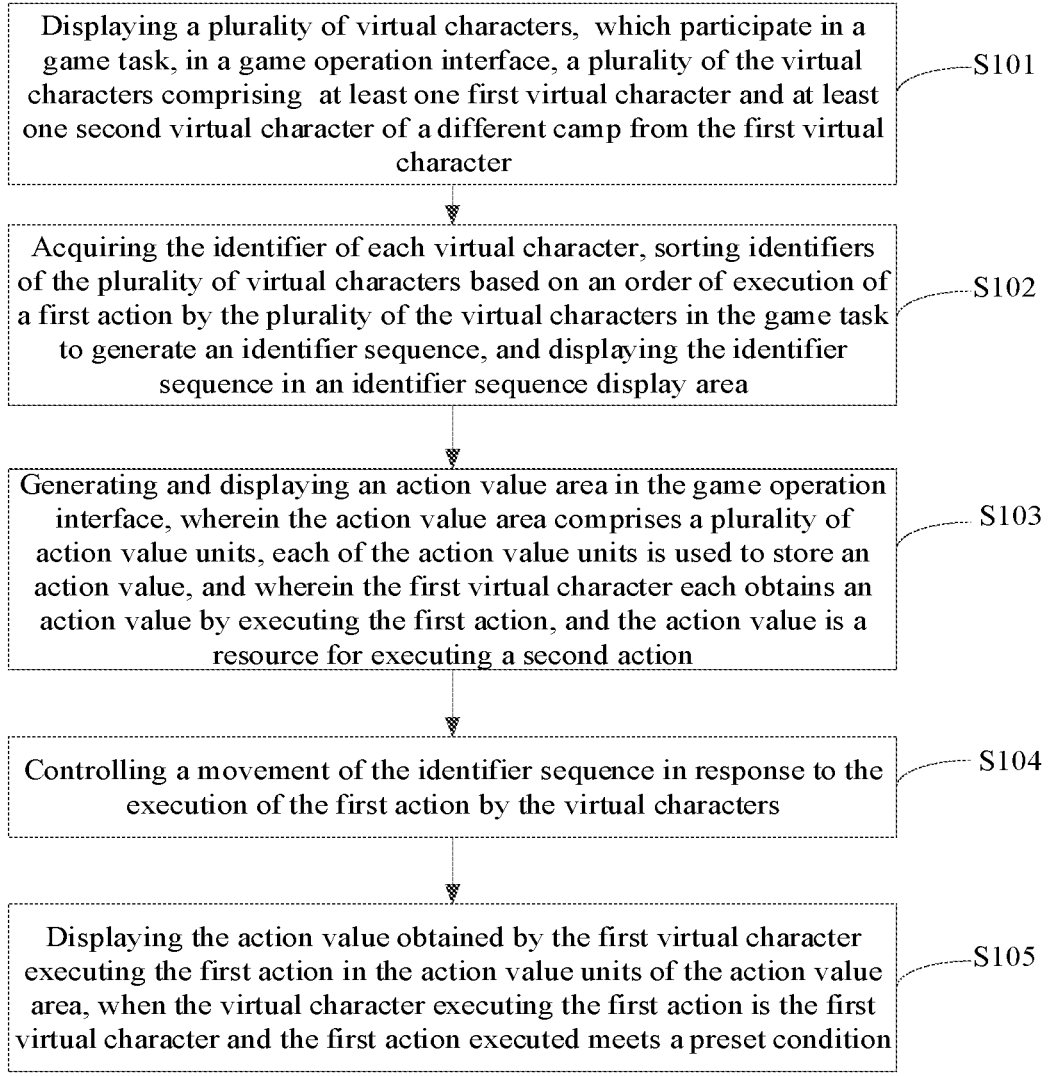
FIG. 1 shows a flowchart of an interaction method provided by an embodiment of the present disclosure.

As shown in FIG. 1, which is a flowchart of an interaction method provided by an embodiment of the present disclosure, the interaction method of the embodiment of the present disclosure is applied to a game scene and mainly comprises following steps S101~S105:

S101, displaying a plurality of virtual characters, which participate in a game task, in a game operation interface, a plurality of the virtual characters comprising at least one first virtual character and at least one second virtual character of a different camp from the first virtual character.

The plurality of virtual characters comprise not only a first virtual character controlled by an operating user, but also a second virtual character that is in a different camp from the first virtual character and is fighting against the first virtual character.

Figure 2A:
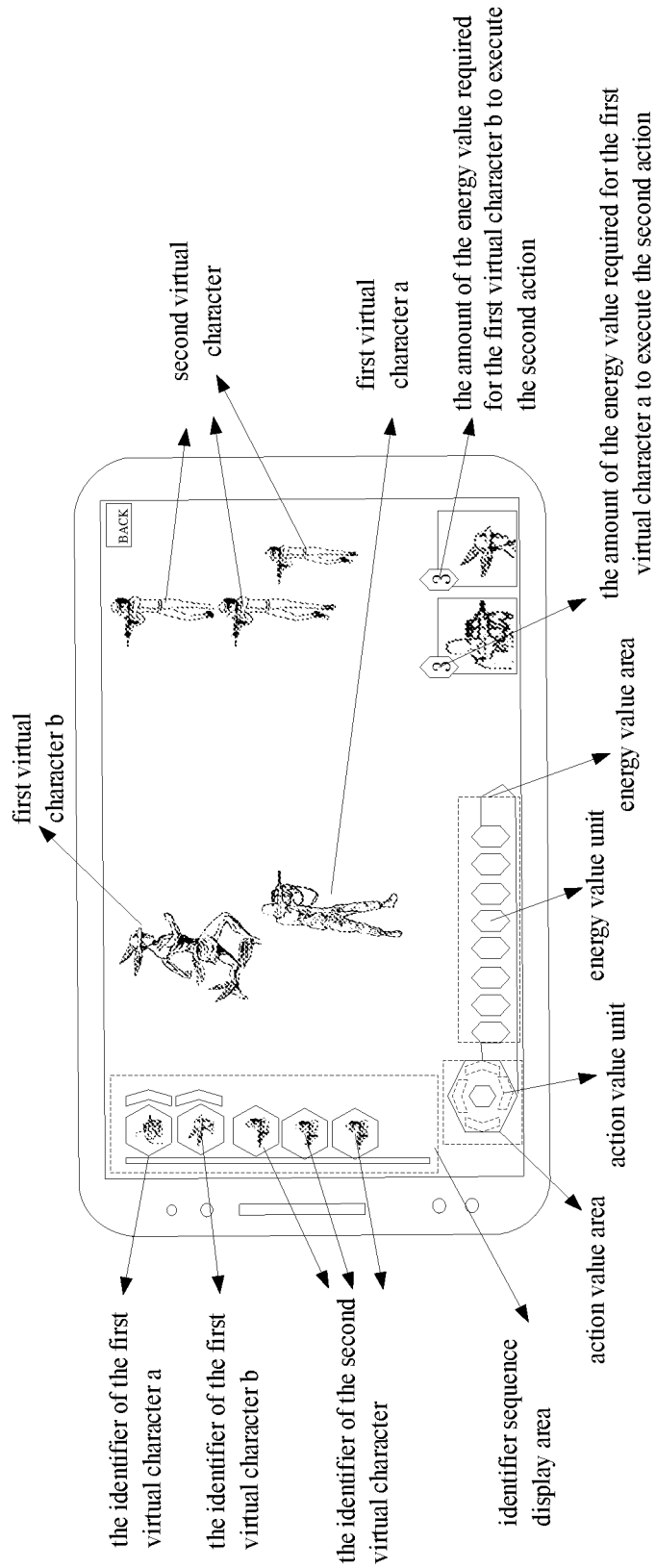
FIG. 2A is a schematic diagram of a game operation interface in the interaction method provided by an embodiment of the present disclosure.
Figure 2B:
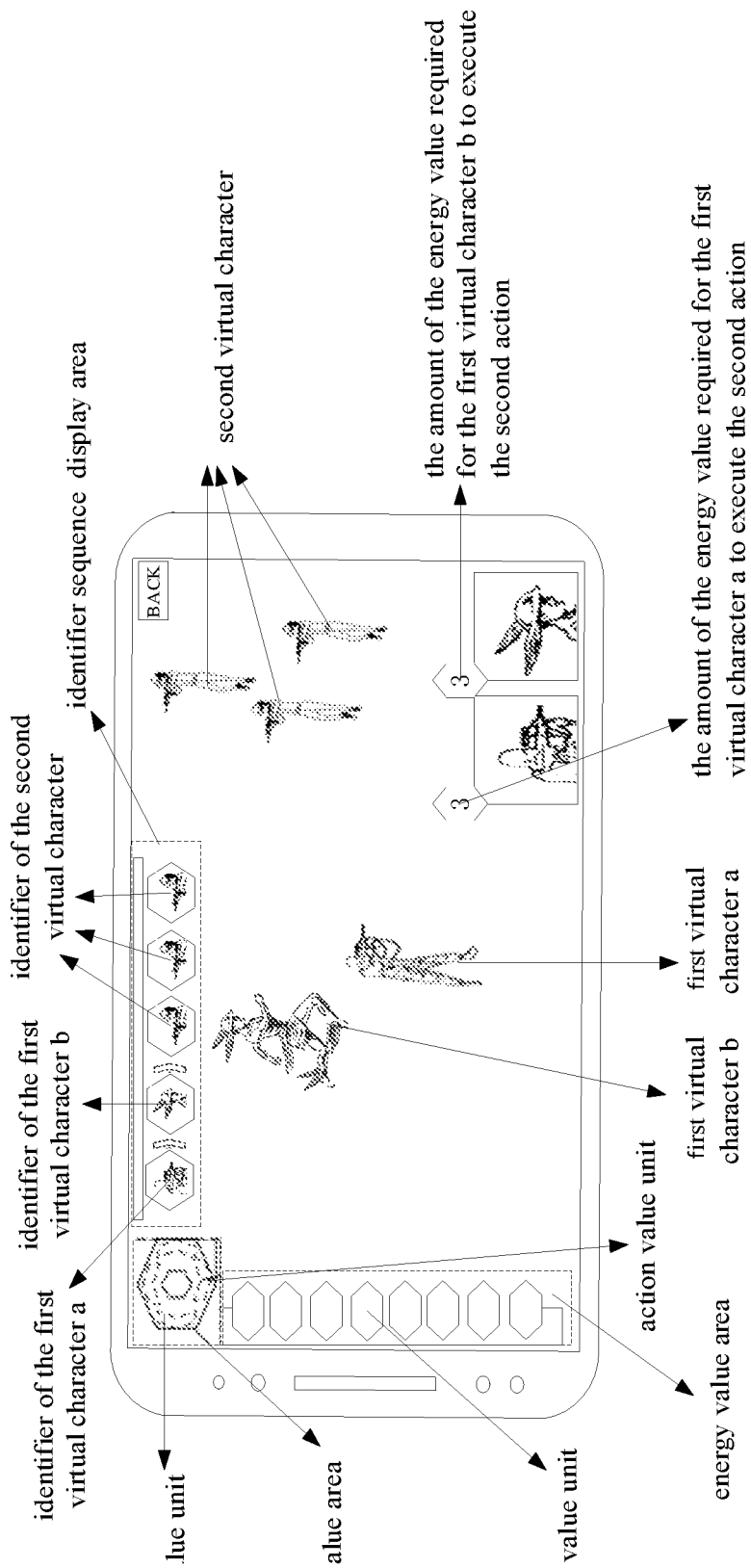
FIG. 2B shows a schematic diagram of another game operation interface in the interaction method provided by an embodiment of the present disclosure.

For example, the first virtual character controlled by the operating user and the second virtual character fighting against the first virtual character can be displayed in the game operation interface; specifically, the game operation interface with a plurality of first virtual characters and a plurality of second virtual characters is shown in FIG. 2A or FIG. 2B.

Following the above step S101, the interaction method provided by the embodiment of the present disclosure further comprises:

S102, acquiring identifiers of virtual characters, sorting identifiers of the plurality of virtual characters based on an order of execution of a first action by the plurality of the virtual characters in the game task to generate an identifier sequence, and displaying the identifier sequence in an identifier sequence display area.

The identifier of a virtual character may comprise, for example, but not limited to, at least one selected from the group consisting of the image identifier of the virtual character, the name identifier of the virtual character, and the identifier serial number; the embodiment of the present disclosure takes the identifier of a virtual character comprising the image identifier of the virtual character as an example to explain in detail; for example, the first action may comprise, but not limited to, at least one selected from the group consisting of an attack action, a flash action, an attack avoidance action and the like, of the virtual character.

For example, the game operation interface as shown in FIG. 2A or 2B further comprises an identifier sequence display area and an identifier sequence located in the identifier sequence display area, and the identifier sequence can be formed by arranging the image identifiers of virtual characters according to the order in which each virtual character executes the first action in the game task; generally, in order to facilitate an user to quickly know the identifier of the first virtual character that the user can manipulate in the identifier sequence, the identifier of the first virtual character can be highlighted in the identifier sequence. For example, the identifier of the first virtual character in the identifier sequence can be highlighted by at least one way of highlighting the identifier of the first virtual character in the identifier sequence, marking a special symbol at the corresponding position of the identifier of the first virtual character in the identifier sequence, and the like. In both FIG. 2A and FIG. 2B, the identifier of the first virtual character in the identifier sequence is highlighted by marking the corresponding position of the identifier of the first virtual character in the identifier sequence with an arrow symbol. Also, the arrow symbol can also be used to represent that the first virtual character can get an action value after executing the first action, which can mean the action value.

Following the above step S102, the interaction method provided by the embodiment of the present disclosure further comprises:

S103, displaying an action value area in the game operation interface, wherein the action value area comprises a plurality of action value units, each of the action value units is used to store an action value, and the first virtual character each obtains an action value by executing the first action, and the action value is a resource for executing a second action.

The action value units in the action value area can be arranged in any shape, and in the embodiment of the present disclosure, the action value units in the action value area are arranged in a circular pattern as an example for detailed description. The second action may comprise, for example, but not limited to, the virtual character releasing a skill, including releasing an ultimate skill, releasing a special skill, etc.

In the specific implementation, displaying an energy value area on one side of the action value area; the energy value area comprises a plurality of energy value units, and each energy value unit is used to store an energy value. In order to better show the interaction rules of game, after an action, the action value carried by the first virtual character can be stored in the action value unit in the action value area, after the action value in the action value area is accumulated to a preset amount, it can be automatically converted into an energy value and stored in the energy value unit in the energy value area for use when the first virtual character releases skills (that is, executing the second action). The preset amount can be set according to an actual demand, and there is no specific restriction here, that is, the amount of action value units in the action value area can be set according to the actual demand, and there is no specific restriction here; in addition, the amount of energy value units included in the energy value area can also be set according to the actual demand, and there is no specific limitation here.

In one embodiment, an identifier positioned at the beginning and/or the end of the identifier sequence is adjacent to the action value area; for example, as shown in FIG. 2A, the identifier arranged at the end of the identifier sequence can be adjacent to the action value area, so that when the first action executed by the first virtual character meets a preset condition, what can be displayed is that the first virtual character corresponding to the identifier arranged at the end of the identifier sequence sends the action value obtained by executing the first action into the action value area, thus visually showing the continuous process of action value accumulation; as shown in FIG. 2B, the first identifier in the identifier sequence can also be adjacent to the action value area.

In addition, the action value area and the energy value area can be located in the same row or the same column, so that it is convenient to present a process of subsequently converting the action value into the energy value; in one way, the row or column where the action value area and the energy value area are located can be perpendicular to the identifier sequence; that is, the identifier sequence, the action value area, and the energy value area are arranged in an L-shape.

In a specific embodiment, in the case of the identifier sequence being of a longitudinal arrangement and the action value area and the energy value area being of a transverse arrangement, the longitudinal central axis of the identifier sequence is coaxial with the longitudinal central axis of the action value area; in the case of the identifier sequence being of a transverse arrangement and the action value area and the energy value area being of a longitudinal arrangement, the transverse central axis of the identifier sequences is coaxial with the transverse central axis of the action value areas.

For example, a game operation interface that specifically displays the plurality of virtual characters (i.e., a first virtual character a, a first virtual character b and a plurality of second virtual characters), and an identifier sequence formed by the image identifiers corresponding to the first virtual character a, the second virtual character b and the plurality of second virtual characters respectively, as well as an action value area and an energy value area, can be as shown in FIG. 2A or FIG. 2B, in which the identifier sequence in FIG. 2A is longitudinally arranged, and the action value area and the energy value area are transversely arranged. The action value area shown in both FIG. 2A and FIG. 2B comprises four action value units and the energy value area shown in both FIG. 2A and FIG. 2B comprise eight energy value units.

Following step S103, the interaction method provided by the embodiment of the present disclosure further comprises:

S104, controlling a movement of the identifier sequence in response to the execution of the first action by the virtual character.

In a specific implementation, when any virtual character executing the first action, placing an identifier of the virtual character at the beginning and/or the end position in the identifier sequence adjacent to the action value area, and controlling the whole identifier sequence to move toward the action value area.

In a specific embodiment, in response to any first virtual character executing the first action, placing an identifier of the first virtual character at the beginning and/or the end position in the identifier sequence adjacent to the action value area, and controlling the identifier sequence to move toward the action value area.

Following step S104, the interaction method provided by the embodiment of the present disclosure further comprises:

S105, displaying the action value obtained by the first virtual character executing the first action in an action value unit of the action value area, when the virtual character executing the first action is the first virtual character and the first action executed meets a preset condition.

In a specific implementation, when it is determined that the virtual character executing the first action is the first virtual character and the first action executed meets the preset condition, the action value obtained by the first virtual character executing the first action is stored in an action value unit in the action value area, and the action value obtained by the first virtual character executing the first action is displayed in the action value unit in the action value area; the preset condition may comprise, but not limited to, the completion of the execution of the first action, or the progress of the first action reaches a set progress threshold and so on; the set progress threshold may be set according to the actual demand, and there is no specific restriction here.

Figure 3:
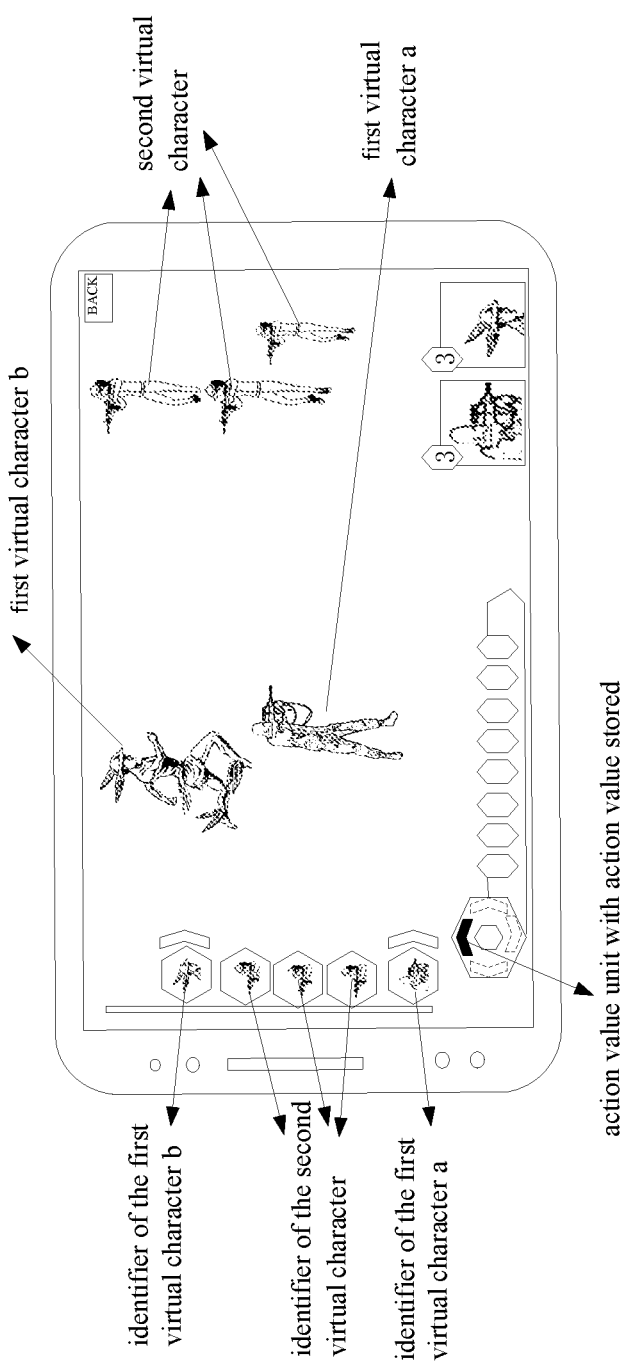
FIG. 3 shows a schematic diagram of a game operation interface, after a first virtual character executes a first action, in the interaction method provided by an embodiment of the present disclosure.

For example, if the first virtual character is shown in FIG. 2A executes an attack on any second virtual character, during the attack executed by the first virtual character a, the first virtual character a is controlled to move to the second virtual character and return back to its initial position, and the identifier of the first virtual character a is controlled to move to the bottom of the identifier sequence (here, because the identifier arranged at the end position in the identifier sequence in FIG. 2A is adjacent to the action value area, then the identifier of the first virtual character a is controlled to move to the end position adjacent to the action value area in the identifier sequence), the identifiers of the first virtual character b and the plurality of second virtual characters are controlled to move towards the action value area respectively, and the specific display interface can be as shown in FIG. 3; in addition, when the first virtual character a execute the first action, the action value can be obtained, and the arrow located at the corresponding position of the identifier of the first virtual character a can be highlighted to characterize the action value obtained by the first virtual character a, for example, in FIG. 3, the action value obtained by the first virtual character a is stored in the action value unit of the action value area by characterizing the action value unit with a black block.

In practice, after each of the action value units of the action value area has stored a corresponding action value, the action values in the action value area can be converted into energy values, and storing the energy values that has been converted in the energy value units of the energy value area.

Here, the amount of energy values converted from the action values in the action value area may be fixed.

Alternatively, the action values in the action value area can be converted into the energy values according to a conversion ratio between the action values in the action value area and the energy values.

The conversion ratio here can have been set; in specific implementations, the conversion ratio can also be determined according to, but not limited to, any of the following A1-A2 methods:

A1, determining the conversion ratio according to the first virtual character corresponding to each of the action values in the action value area and an action gain coefficient of the first virtual character.

The action gain coefficient of the first virtual character can be determined according to the lethality level of the first virtual character and/or the combat capability of the first virtual character, and the specific method for determining the action gain coefficient of the first virtual character can be set according to the actual demand, and there is no specific restriction here.

For example, there are five first virtual characters (namely, the first virtual character a, the first virtual character b, the first virtual character c, the first virtual character d and the first virtual character e), according to the lethality level of each of the first virtual characters, it can be determined that the action gain coefficient corresponding to each of the first virtual characters comprise: the action gain coefficient corresponding to the first virtual character a is 1, the action gain coefficient corresponding to the first virtual character b is 1, and the action gain coefficient corresponding to the first virtual character c is 2, and the action gain coefficient corresponding to the first virtual character d is 2, and the action gain coefficient corresponding to the first virtual character e is 2.

At this time, if the action value area comprises five action value units, and these five action value units all store corresponding action values, comprising two action value units filled by the action value of the first virtual character a, two action value units filled by the action value of the first virtual character b, and one action value unit filled by the action value of the first virtual character e respectively, and according to the first virtual character corresponding to each action value contained in the action value area and the action gain coefficient of the first virtual character, the conversion ratio can be determined to be 5:6 (that is, 2×1+2×1+1×2=6), that is, five action values can be converted into six energy values.

A2, determining the conversion ratio according to a current stage of game.

The stage of game can comprise, for example, but not limited to, at least one of a game level, a game turn level, etc. The conversion ratios corresponding to different game stages can be set according to actual needs, and there is no specific restriction here.

For example, if the conversion ratio corresponding to a first round is 5:3, that is, the first round can convert five action values into three energy values; the corresponding conversion ratio in a second round is 5:4, that is, five action values can be converted into four energy values in the second round; the conversion ratio of a third round is 5:5, that is, five action values can be converted into five energy values in the second round, etc. If it is determined that the game is in the second round at present, the conversion ratio is determined to be 5:4.

Figure 4A:
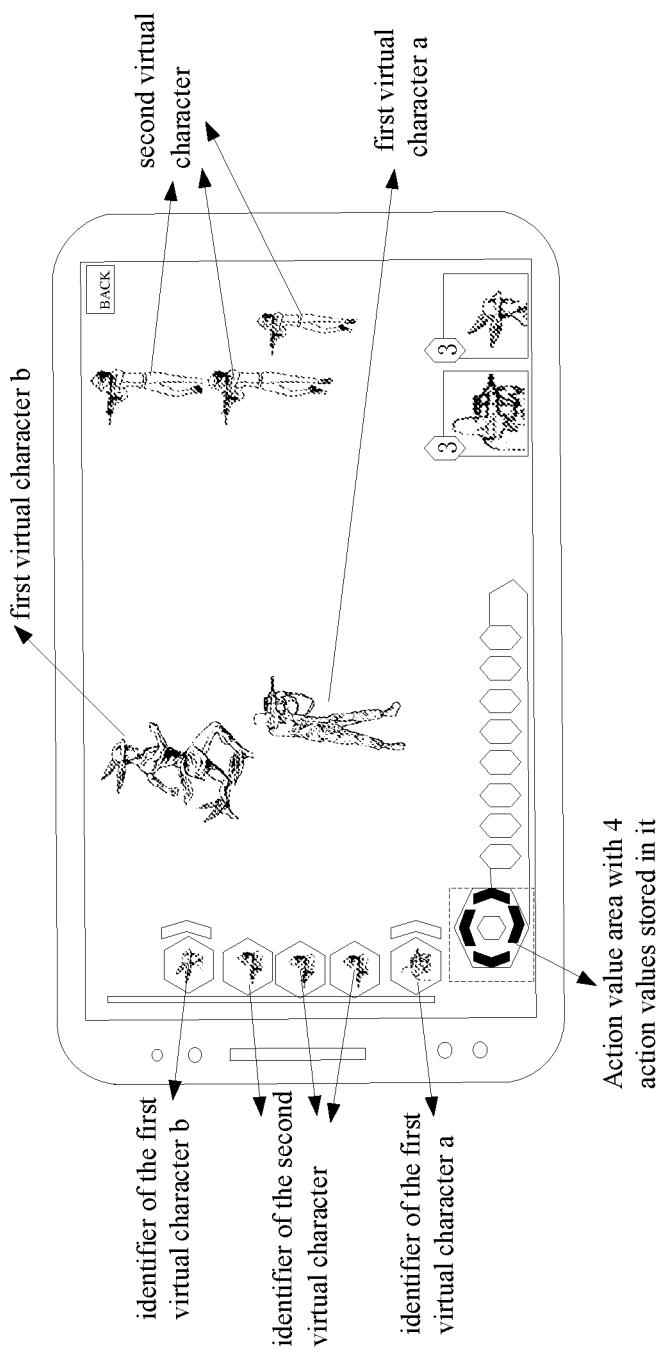
FIG. 4A shows a schematic diagram of a game operation interface, in which each action value unit in an action value area stores a corresponding action value, in the interaction method provided by an embodiment of the present disclosure.
Figure 4B:
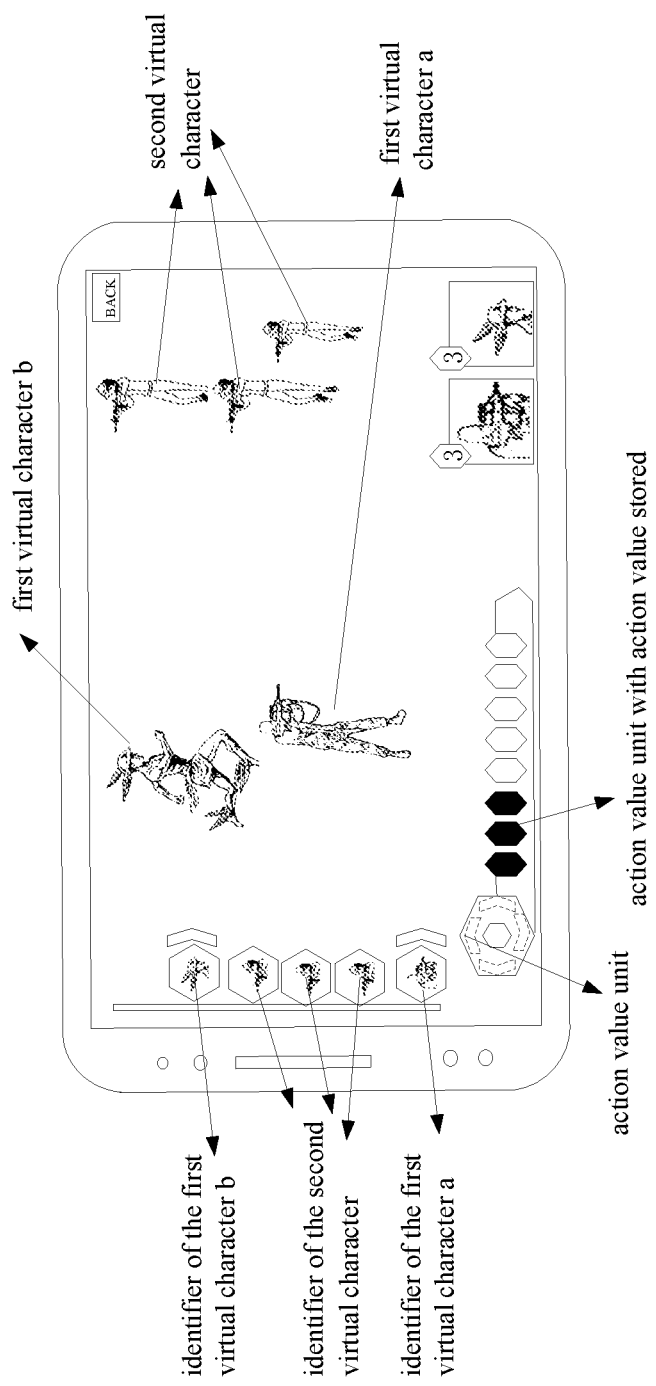
FIG. 4B is a schematic diagram of a game operation interface, in which an action value is converted to an energy value and a converted energy value is stored to an energy value unit in the energy value area, in the interaction method provided by an embodiment of the present disclosure.

In practice, after determining the conversion ratio, if it is determined that each action value unit in the action value area currently stores an action value, the action values in the action value area can be converted into energy values according to the conversion ratio, and the converted energy values can be stored in the energy units in the energy value area. The display interface for converting specific action values into energy values can be shown in FIG. 4A and FIG. 4B; FIG. 4A is a display interface before conversion, which shows an action value area containing four action values and an energy value area containing no energy value; FIG. 4B is a display interface after conversion, if the conversion ratio is determined to be 4:3, an action value area containing 0 action value and an energy value area containing 3 energy values are shown in FIG. 4B.

In practice, the energy value stored in the energy value area is the resource consumed by the first virtual character when executing the second action; in order to facilitate the user to know the amount of energy value consumed by the first virtual character when executing the second action during the game, the amount of energy value required by each first virtual character to execute the second action can be displayed in the game operation interface.

The amount of the energy value required for each of the first virtual characters to execute the second action is associated with the action attribute of the second action. Here, the action attribute of the second action may comprise, for example, but not limited to, at least one of a skill level, a skill lethality, etc. For example, generally the higher the skill level and/or the greater the skill lethality of the executed second action (i.e., the released skill) correspondingly, the greater the amount of energy values required to execute the second action, that is, the second action with higher skill level and/or greater lethality needs to consume more energy values.

For example, the game operation interfaces in FIG. 2A to FIG. 4B also show the amount of energy values required by each first virtual character to execute the second action.

In a specific implementation, when the first virtual character executes the second action, in response to each of the first virtual characters executing the second action, an energy consumption special effect of the energy values of a corresponding amount is displayed in the energy value area, according to the amount of energy value required by the second action.

The energy consumption special effect is the special effect showing the disappearance progress of the energy value in the energy value unit in the energy value area from existence to absence, which may comprise, for example, but not limited to, at least one of a special effect of energy changing color and disappearing, a special effect of energy burning and disappearing, etc . . . .

Figure 5A:
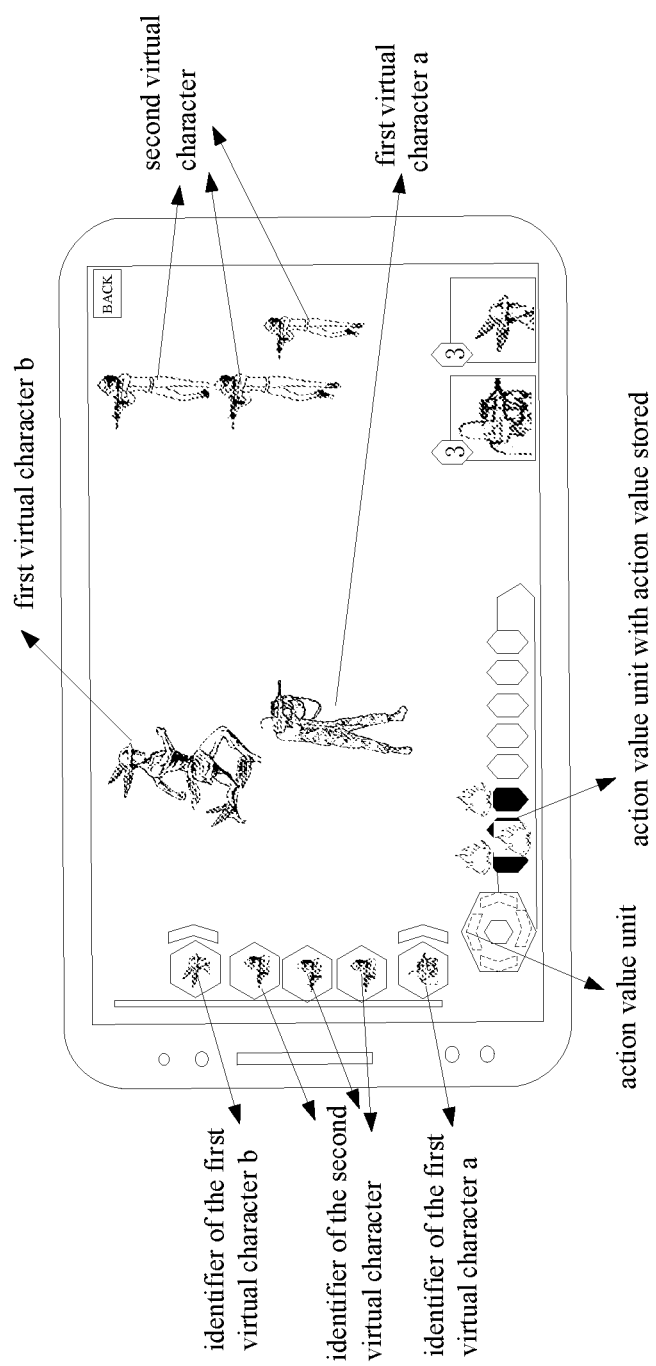
FIG. 5A is a schematic diagram of a game operation interface with an energy consumption special effect being displayed, after a first virtual character executes a second action, in the interaction method provided by an embodiment of the present disclosure.
Figure 5B:
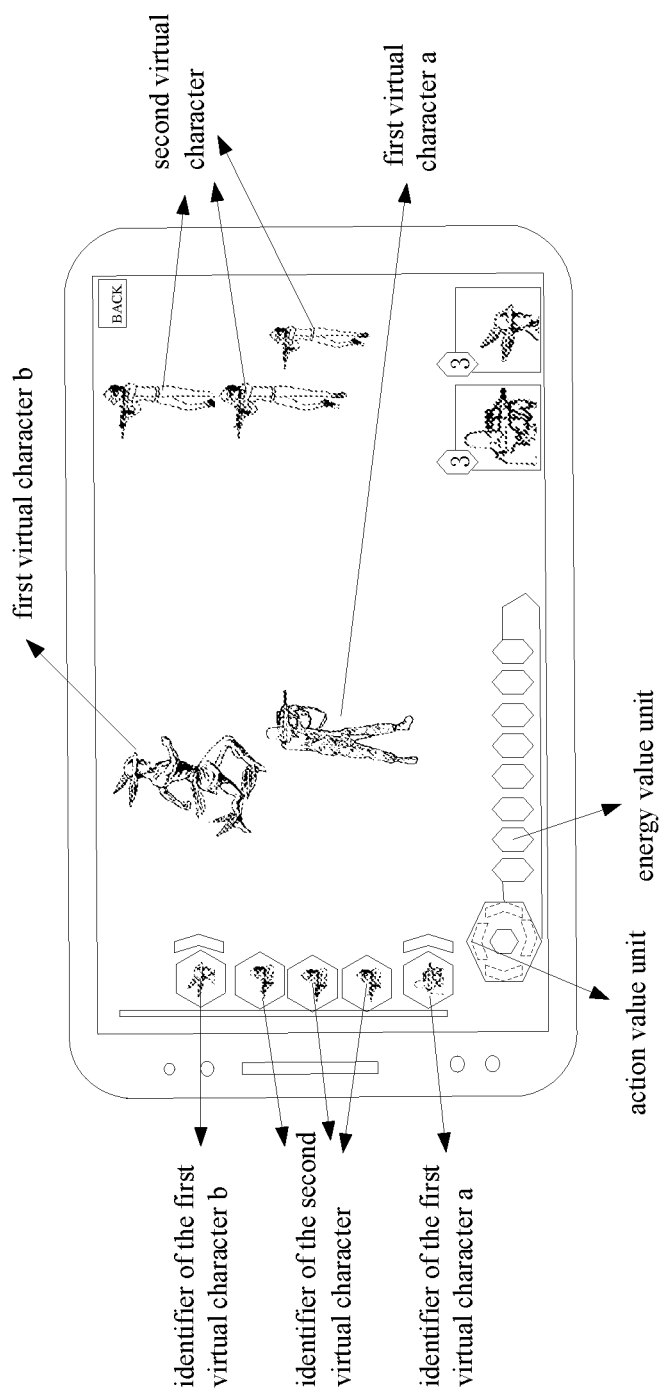
FIG. 5B shows a schematic diagram of a game operation interface with an energy value having been consumed, after the first virtual character executes a second action, in the interaction method provided by an embodiment of the present disclosure.

An exemplary and specific display interface displaying energy consumption special effect can be shown in FIG. 5A and FIG. 5B, wherein FIG. 5A shows a special effect of energy burning in the energy value unit during the energy consumption process, and FIG. 5B shows a display interface after the energy in the energy value unit disappears during the energy consumption process.

In a specific implementation, upon the energy consumption special effect is displayed, a completion special effect showing each of the first virtual characters completing the second action is displayed as well; the completion special effect may comprise, for example, but not limited to, at least one of the first virtual character emitting light, the first virtual character flying out, and the like.

Figure 6:
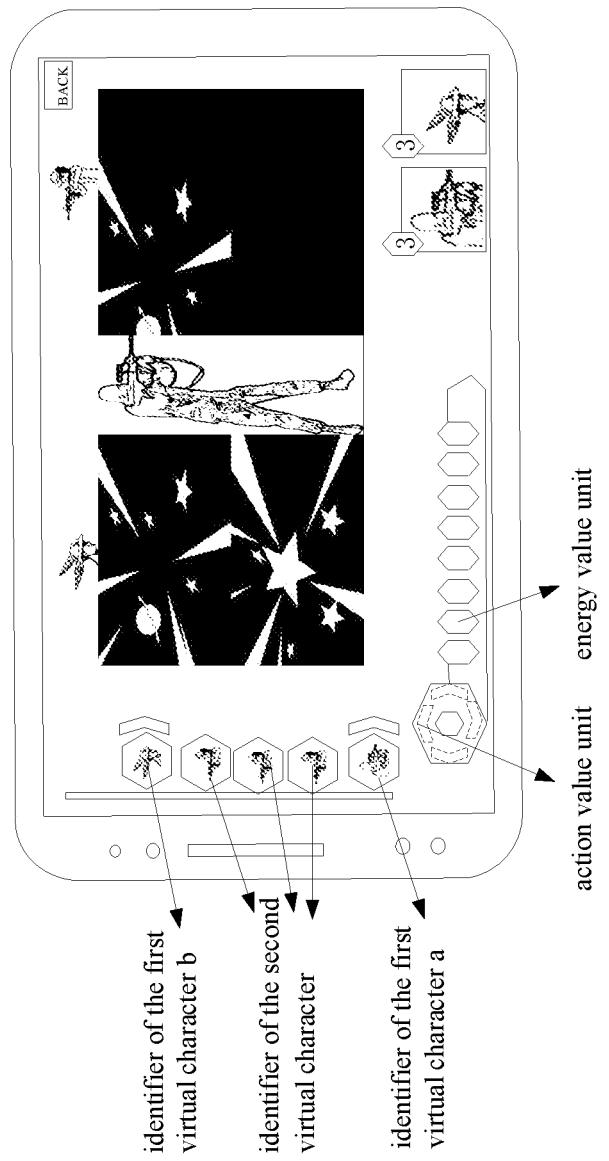
FIG. 6 illustrates a schematic diagram of a game operation interface, showing a completion special effect of the first virtual character completing the second action, in the interaction method provided by an embodiment of the present disclosure.

An exemplary, a specific game operation interface displaying a completion special effect showing each of the first virtual characters completing the second action can be shown in FIG. 6.

In a specific implementation, because the second virtual character fighting against the first virtual character is also displayed in the game operation interface, upon displaying the energy consumption special effect, and displaying an injury special effect showing the second virtual character being injured by the second action; the injury special effect may comprise, for example, but not limited to, at least one of an effect of less blood volume of the second virtual character, an effect of the second virtual character being injured, and the like.

In an embodiment of the present disclosure, when the virtual character executes the first action, the current action of the virtual character can be visually reflected by moving the identifier sequence, and when it is determined that the virtual character executing the first action is the first virtual character and the first action executed meets the preset condition, the action value obtained after the first virtual character executes the first action can be stored in an action value unit in the action value area, and the action value obtained by the first virtual character executing the first action is displayed in the action value unit in the action value area, so that the accumulation process of the action value is vividly displayed, which is convenient for the user to understand the rules of game and the interaction process and have an improved interaction experience.

In addition, in an embodiment of this disclosure, after each action value unit in the action value area stores the corresponding action value, the action value will be converted into the energy value, and the storage process of storing the energy value in the energy value unit in the energy value area will be visually displayed to the user, so that the user can easily understand the conversion process between the action values and the energy values in the rules of game.

It can be understood by those skilled in the art that in the above-mentioned methods of the specific embodiments, the order that each step is described here does not mean strict execution order and constitutes no limitation on the implementation process, and the specific execution order of each step should be determined according to its function and the possible internal logic.

Based on the same inventive concept, the embodiments of the present disclosure also provide interactive devices corresponding to the interaction methods. Because the principle of solving problems by the devices in the embodiments of the present disclosure is similar to the above-mentioned interaction methods in the embodiments of the present disclosure, the implementation of the devices can refer to the implementation of the methods, and the description is not repeated here.

Figure 7:
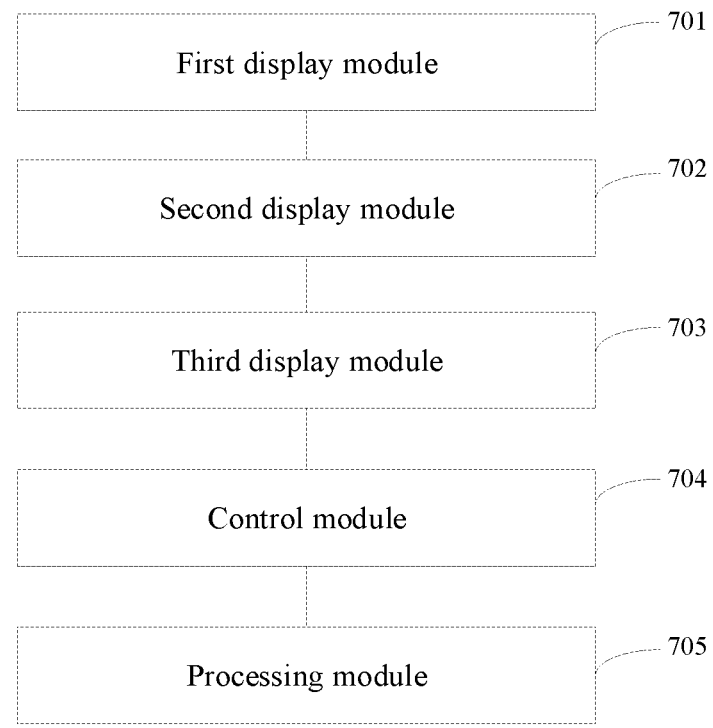
FIG. 7 illustrates a schematic diagram of an interaction device provided by an embodiment of the present disclosure.

As shown in FIG. 7, which illustrates a schematic diagram of an interaction apparatus provided by an embodiment of the present disclosure, the interaction apparatus comprises a first display module 701, a second display module 702, a third display module 703, a control module 704 and a processing module 705.

The first display module 701 is configured to display a plurality of virtual characters, which participate in a game task, in a game operation interface, and the plurality of the virtual characters comprise at least one first virtual character and at least one second virtual character of a different camp from the first virtual character.

The second display module 702 is configured to obtain the identifiers of the virtual characters, sort identifiers of the plurality of virtual characters based on an order of execution of a first action by the plurality of the virtual characters in the game task to generate an identifier sequence, and display the identifier sequence in an identifier sequence display area.

The third display module 703 is configured to generate and display an action value area in the game operation interface, the action value area comprises a plurality of action value units, each of the action value units is used to store an action value, the first virtual character each obtains an action value by executing the first action, and the action value is a resource for executing a second action.

The control module 704 is configured to control a movement of the identifier sequence in response to the execution of the first action by the virtual characters.

The processing module 705 is configured to display the action value obtained by the first virtual character executing the first action in the action value units of the action value area, when the virtual character executing the first action is the first virtual character and the first action executed meets a preset condition.

In one possible embodiment, an identifier positioned at the beginning and/or the end of the identifier sequence is adjacent to the action value area; the control module 704, when executing the controlling the movement of the identifier sequence in response to the execution of the first action by the virtual character, is specifically configured to: in response to any one of first virtual characters executing the first action, place an identifier of the any one of the first virtual characters at the beginning and/or the end position in the identifier sequence adjacent to the action value area, and control the identifier sequence to move toward the action value area.

In one possible embodiment, the third display module 703 is further configured to: display an energy value area on one side of the action value area, wherein the energy value area comprises a plurality of energy value units, each energy value unit is used to store an energy value, and the identifier sequence, the action value area and the energy value area are arranged in an L-shape;

The processing module 705 is further configured to: after each of the action value units of the action value area has stored a corresponding action value, convert action values in the action value area into energy values, and storing the energy values that have been converted in the energy value units of the energy value area.

In one possible embodiment, the processing module 705, when executing the conversion of the action values in the action value area into the energy values, is specifically configured to: convert the action values in the action value area into the energy values according to a conversion ratio between the action values in the action value area and the energy values.

In one possible embodiment, the processing module 705 determines the conversion ratio according to the following ways:determining the conversion ratio according to convert the action values in the action value area into the energy values according to a conversion ratio between the action values in the action value area and the energy values first virtual character corresponding to each of the action values in the action value area and an action gain coefficient of the first virtual character; and/or determining the conversion ratio according to a current stage of game.

In one possible embodiment, the third display module 703 is further configured to: display an amount of an energy value required for each of first virtual characters to execute the second action in the game operation interface, wherein the amount of the energy value required for each of the first virtual characters to execute the second action is associated with an action attribute of the second action.

In one possible embodiment, the third display module 703 is further configured to: in response to each of the first virtual characters executing the second action, display an energy consumption special effect of energy values of a corresponding amount in the energy value area, according to the amount of the energy value required by the second action.

In one possible embodiment, upon the third display module 703 displaying the energy consumption special effect, the third display module 703 is further configured to: display a completion special effect showing each of the first virtual characters completing the second action.

In one possible embodiment, upon the third display module 703 displaying the energy consumption special effect, the third display module 703 is further configured to: display an injury special effect showing the second virtual character being injured by the second action.

In one possible embodiment, the action value units in the action value area are arranged in a circular pattern.

In the embodiment of the present disclosure, the identifier sequence consisting of the identifier of the plurality of virtual characters can be displayed in the game operation interface, and the action value area can also be displayed; when the virtual character executing the first action, the current action of the virtual character can be visually reflected by moving the identifier sequence, and when it is determined that the virtual character executing the first action is the first virtual character and the executed first action meets the preset condition, the action value obtained by the first virtual character after executing the first action can be stored in an action value unit in the action value area, and the action value obtained by the first virtual character executing the first action can be displayed in the action value unit in the action value area, so that the accumulation process of the action value can be visually displayed, which is convenient for the user to understand the rules of game and the interaction process and improve the interaction experience.

In addition, in an embodiment of this disclosure, after the action value units in the action value area have been stored the corresponding action values, the action values will be converted into the energy values, and the storage process of storing the energy value in the energy value unit in the energy value area will be visually displayed to the user, so that the user can easily understand the conversion process between the action values and the energy values in the rules of game.

For the description of the processing flow of each module in the apparatus and the interaction flow between modules, please refer to the relevant description in the above method embodiment, and will not be described in detail here.

Figure 8:
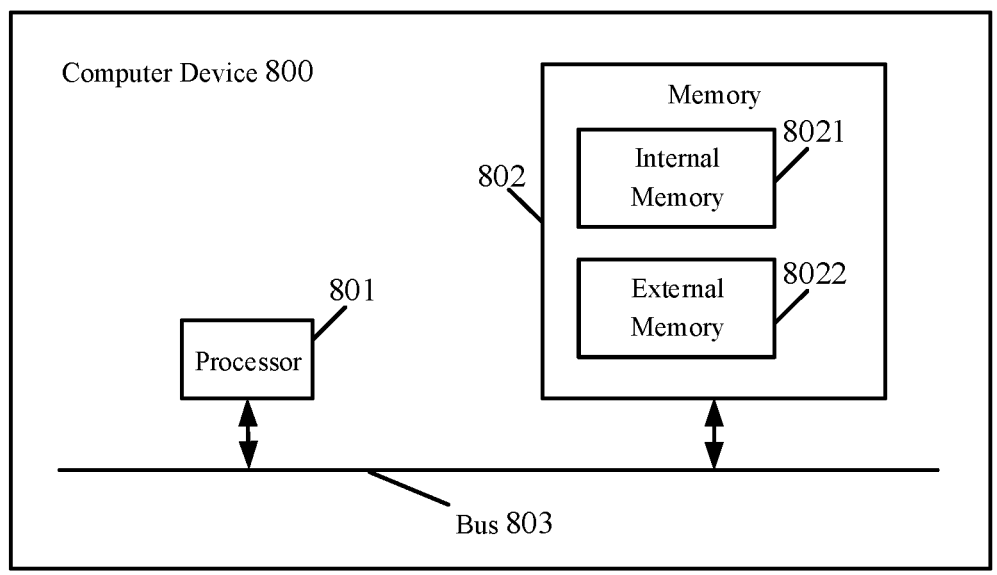
FIG. 8 illustrates a schematic diagram of a computer device provided by an embodiment of the present disclosure.

Based on the same technical concept, an embodiment of the application further provides a computer device. Referring to FIG. 8, which illustrates the structural diagram of a computer device 800 provided in an embodiment of the present application, the computer device 800 comprises a processor 801, a memory 802, and a bus 803. The memory 802 is configured to store execution instructions, comprising an internal memory 8021 and an external memory 8022; the internal memory 8021 here is also called internal storage, which is configured to temporarily store the operation data in the processor 801 and the data exchanged with the external memory 8022 such as a hard disk. The processor 801 exchanges data with the external memory 8022 through the memory 8021, and when the computer device 800 is running, the processor 801 communicates with the memory 802 through the bus 8803, so that the processor 801 executes the following instructions:

displaying a plurality of virtual characters, which participate in a game task, in a game operation interface, a plurality of the virtual characters comprising at least one first virtual character and at least one second virtual character of a different camp from the first virtual character;

acquiring the identifier of each virtual character, sorting identifiers of the plurality of virtual characters based on an order of execution of a first action by the plurality of the virtual characters in the game task to generate an identifier sequence, and displaying the identifier sequence in an identifier sequence display area;

generating and displaying an action value area in the game operation interface, wherein the action value area comprises a plurality of action value units, each of the action value units is used to store an action value, and wherein the first virtual character each obtains an action value by executing the first action, and the action value is a resource for executing a second action;

controlling a movement of the identifier sequence in response to the execution of the first action by the virtual characters; and displaying the action value obtained by the first virtual character executing the first action in the action value units of the action value area, when the virtual character executing the first action is the first virtual character and the first action executed meets a preset condition.

The specific processing flow of the processor 801 can refer to the description of the above method embodiment(s), and will not be repeated here.

An embodiment of the present disclosure also provides a computer-readable storage medium, on which a computer program is stored, and when the computer program is executed by a processor, the steps of any interaction method described in the above method embodiments are executed. The storage medium can be a volatile or non-volatile computer-readable storage medium.

An embodiment of the present disclosure also provides a computer program product, which carries program codes, and the program codes comprise instructions that can be used to execute the steps of the interaction method described in the above-mentioned method embodiment. For details, please refer to the above-mentioned method embodiment, which is not repeated here.

The above computer program products can be realized by hardware, software or their combination. In one alternative embodiment, the computer program product is embodied as a computer storage medium, and in another alternative embodiment, the computer program product is embodied as a software product, such as a Software Development Kit (SDK) and the like.

It can be clearly understood by those skilled in the art that for the convenience and conciseness of description, the specific working process of the system and device described above can refer to the corresponding process in the aforementioned method embodiment, and will not be repeated here. In several embodiments provided by this disclosure, it should be understood that the disclosed system, apparatus and method can be realized in other ways. The apparatus embodiment described above is only schematic, for example, the division of the units is only a logical function division, and there may be another division method in actual implementation, another example, multiple units or components may be combined or integrated into another system, or some features may be ignored or not implemented. On the other hand, the mutual coupling or direct coupling or communication connection shown or discussed can be indirect coupling or communication connection through some communication interfaces, apparatuses or units, which can be in electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of this embodiment.

In addition, each functional unit in each embodiment of the present disclosure may be integrated into one processing unit, or each unit may exist physically alone, or two or more units may be integrated into one unit.

If the functions are realized in the form of software functional units and sold or used as independent products, they can be stored in a processor-executable nonvolatile computer-readable storage medium. Based on this understanding, the technical solution of the present disclosure can be embodied in the form of a software product, which is stored in a storage medium and comprises several instructions to make a computer device (which can be a personal computer, a server, a network device, etc.) execute all or part of the steps of the method described in various embodiments of the present disclosure. The aforementioned storage media comprise: U disk, mobile hard disk, Read-Only Memory (ROM), Random Access Memory (RAM), magnetic disk or optical disk and other media that can store program codes.

Finally, it should be explained that the above-mentioned embodiments are only specific embodiments of the disclosure, which are used to illustrate the technical scheme of the disclosure, but not to limit it. The protection scope of the disclosure is not limited to this. Although the disclosure has been described in detail with reference to the above-mentioned embodiments, it should be understood by ordinary people in the field that any person familiar with the technical field can still modify or easily think of changes to the technical scheme recorded in the above-mentioned embodiments within the technical scope of the disclosure, or however, these modifications, changes or substitutions do not make the essence of the corresponding technical scheme deviate from the spirit and scope of the technical scheme of the embodiment of this disclosure, and should be included in the protection scope of this disclosure. Therefore, the scope of protection of this disclosure should be based on the scope of protection of the claims.

What is claimed is:

1. An interaction method, comprising:
    displaying a plurality of virtual characters, which participate in a game task, in a game operation interface, a plurality of the virtual characters comprising at least one first virtual character and at least one second virtual character of a different camp from the first virtual character;
    sorting identifiers of the plurality of virtual characters based on an order of execution of a first action by the plurality of the virtual characters in the game task to generate an identifier sequence, and displaying the identifier sequence in an identifier sequence display area;

displaying an action value area in the game operation interface, wherein the action value area comprises a plurality of action value units, and each of the action value units is used to store an action value, and wherein the first virtual character each obtains an action value by executing the first action, and the action value is a resource for executing a second action;

displaying an energy value area on one side of the action value area, wherein the energy value area comprises a plurality of energy value units, and each energy value unit is used to store an energy value;

controlling a movement of the identifier sequence in response to the execution of the first action by the virtual characters; and displaying the action value obtained by the first virtual character executing the first action in the action value units of the action value area, when the virtual character executing the first action is the first virtual character and the first action executed meets a preset condition, wherein the identifier sequence, the action value area, and the energy value area are arranged in an L-shape, and the action value area and the energy value area are arranged in an identical row;

in a case where the identification sequence is of a longitudinal display and the action value area and the energy value area are of a transverse arrangement in the row, a longitudinal central axis of the identification sequence is coaxial with a longitudinal central axis of the action value area;

in a case where the identification sequence is of a transverse display and the action value area and the energy value area are of a longitudinal arrangement in the row, a transverse central axis of the identification sequence is coaxial with a transverse central axis of the action value area; and controlling the movement of the identifier sequence in response to the execution of the first action by the virtual characters, comprises:

in response to any one of first virtual characters executing the first action, placing an identifier of the any one of the first virtual characters in a position, which is most adjacent to the action value area, in the identifier sequence, and controlling positions of other first virtual characters in the identifier sequence to move towards the action value area.

2. The method according to claim 1, wherein an identifier positioned at a beginning and/or an end of the identifier sequence is adjacent to the action value area.

3. The method according to claim 2, further comprising: after each of the action value units of the action value area has stored a corresponding action value, converting action values in the action value area into energy values, and storing the energy values that has been converted in the energy value units of the energy value area.

4. The method according to claim 1, further comprising: after each of the action value units of the action value area has stored a corresponding action value, converting action values in the action value area into energy values, and storing the energy values that has been converted in the energy value units of the energy value area.

5. The method according to claim 4, wherein the converting the action values in the action value area into the energy values, comprises:
converting the action values in the action value area into the energy values according to a conversion ratio between the action values in the action value area and the energy values.

6. The method according to claim 5, wherein the conversion ratio is determined by following way:
determining the conversion ratio according to a first virtual character corresponding to each of the action values in the action value area and an action gain coefficient of the first virtual character; and/or
determining the conversion ratio according to a current stage of game.

7. The method according to claim 4, further comprising:
displaying an amount of an energy value required for each of first virtual characters to execute the second action in the game operation interface, wherein the amount of the energy value required for each of the first virtual characters to execute the second action is associated with an action attribute of the second action.

8. The method according to claim 4, further comprising:
in response to each of the first virtual characters executing the second action, displaying an energy consumption special effect of energy values of a corresponding amount in the energy value area, according to the amount of the energy value required by the second action.

9. The method according to claim 8, wherein upon displaying the energy consumption special effect, the method further comprises:
displaying a completion special effect showing each of the first virtual characters completing the second action.

10. The method according to claim 9, wherein upon displaying the energy consumption special effect, the method further comprises:
displaying an injury special effect showing the second virtual character being injured by the second action.

11. The method according to claim 8, wherein upon displaying the energy consumption special effect, the method further comprises:
displaying an injury special effect showing the second virtual character being injured by the second action.

12. The method according to claim 1, wherein the action value units in the action value area are arranged in a circular pattern.

13. A computer-readable storage medium, wherein a computer program is stored in the computer-readable storage medium, and upon the computer program being run by a computer device, the computer device executes steps of the interaction method according to claim 1.

14. An interaction apparatus, comprising:
a first display module configured to display a plurality of virtual characters, which participate in a game task, in a game operation interface, a plurality of the virtual characters comprising at least one first virtual character and at least one second virtual character of a different camp from the first virtual character;
a second display module configured to sort identifiers of the plurality of virtual characters based on an order of execution of a first action by the plurality of the virtual characters in the game task to generate an identifier sequence, and displaying the identifier sequence in an identifier sequence display area;
a third display module configured to display an action value area in the game operation interface, wherein the action value area comprises a plurality of action value units, and each of the action value units is used to store an action value, and wherein the first virtual character each obtains an action value by executing the first action, and the action value is a resource for executing a second action;

a fourth display module configured to display an energy value area on one side of the action value area, wherein the energy value area comprises a plurality of energy value units, and each energy value unit is used to store an energy value;

a control module configured to control a movement of the identifier sequence in response to the execution of the first action by the virtual characters; and a processing module configured to display the action value obtained by the first virtual character executing the first action in the action value units of the action value area, when the virtual character executing the first action is the first virtual character and the first action executed meets a preset condition, wherein the identifier sequence, the action value area, and the energy value area are arranged in an L-shape, and the action value area and the energy value area are arranged in an identical row;

in a case where the identification sequence is of a longitudinal display and the action value area and the energy value area are of a transverse arrangement in the row, a longitudinal central axis of the identification sequence is coaxial with a longitudinal central axis of the action value area;

in a case where the identification sequence is of a transverse display and the action value area and the energy value area are of a longitudinal arrangement in the row, a transverse central axis of the identification sequence is coaxial with a transverse central axis of the action value area; and controlling the movement of the identifier sequence in response to the execution of the first action by the virtual characters, comprises:

in response to any one of first virtual characters executing the first action, placing an identifier of the any one of the first virtual characters in a position, which is most adjacent to the action value area, in the identifier sequence, and controlling positions of other first virtual characters in the identifier sequence to move towards the action value area.

15. A computer device, comprising:

a processor and a memory, wherein the memory is configured to store machine-readable instructions executable by the processor, the processor is configured to execute the machine-readable instructions stored in the memory, and upon the machine-readable instructions being executed by the processor, the processor executes an interaction method, and the method comprises:

displaying a plurality of virtual characters, which participate in a game task, in a game operation interface, a plurality of the virtual characters comprising at least one first virtual character and at least one second virtual character of a different camp from the first virtual character;

sorting identifiers of the plurality of virtual characters based on an order of execution of a first action by the plurality of the virtual characters in the game task to generate an identifier sequence, and displaying the identifier sequence in an identifier sequence display area;

displaying an action value area in the game operation interface, wherein the action value area comprises a plurality of action value units, and each of the action value units is used to store an action value, and wherein the first virtual character each obtains an action value by executing the first action, and the action value is a resource for executing a second action;

displaying an energy value area on one side of the action value area, wherein the energy value area comprises a plurality of energy value units, and each energy value unit is used to store an energy value;

controlling a movement of the identifier sequence in response to the execution of the first action by the virtual characters; and displaying the action value obtained by the first virtual character executing the first action in the action value units of the action value area, when the virtual character executing the first action is the first virtual character and the first action executed meets a preset condition, wherein the identifier sequence, the action value area, and the energy value area are arranged in an L-shape, and the action value area and the energy value area are arranged in an identical row;

in a case where the identification sequence is of a longitudinal display and the action value area and the energy value area are of a transverse arrangement in the row, a longitudinal central axis of the identification sequence is coaxial with a longitudinal central axis of the action value area;

in a case where the identification sequence is of a transverse display and the action value area and the energy value area are of a longitudinal arrangement in the row, a transverse central axis of the identification sequence is coaxial with a transverse central axis of the action value area; and controlling the movement of the identifier sequence in response to the execution of the first action by the virtual characters, comprises:

in response to any one of first virtual characters executing the first action, placing an identifier of the any one of the first virtual characters in a position, which is most adjacent to the action value area, in the identifier sequence, and controlling positions of other first virtual characters in the identifier sequence to move towards the action value area.

* * * * *